United States Patent [19]

Sheynberg et al.

[11] Patent Number: 5,200,672

[45] Date of Patent: Apr. 6, 1993

[54] CIRCUIT CONTAINING SYMETRICALLY-DRIVEN COIL FOR ENERGIZING ELECTRODELESS LAMP

[75] Inventors: Iosif Sheynberg, Lynn; Fred Whitney, Salem, both of Mass.

[73] Assignee: GTE Products Corporation, Danvers, Mass.

[21] Appl. No.: 792,120

[22] Filed: Nov. 14, 1991

[51] Int. Cl.$^5$ .......................................... H05B 41/24
[52] U.S. Cl. ...................................... 315/248; 315/344
[58] Field of Search ................. 315/248, 39, 344, 267; 313/234, 607; 330/251, 207 A; 331/117 R

[56] References Cited

U.S. PATENT DOCUMENTS

| | | | |
|---|---|---|---|
| 4,048,541 | 9/1977 | Adams et al. | 315/248 |
| 4,245,178 | 1/1981 | Justice | 315/248 |
| 4,383,203 | 5/1983 | Stanley | 315/248 |
| 4,631,449 | 12/1986 | Peters | 315/248 |
| 4,748,383 | 5/1988 | Houkes | 315/248 |
| 4,748,634 | 5/1988 | Hesterman | 315/248 |
| 4,877,999 | 10/1989 | Knapp | 315/248 |

Primary Examiner—Eugene R. LaRoche
Assistant Examiner—A. Zarabian
Attorney, Agent, or Firm—Carlo S. Bessone

[57] ABSTRACT

An arrangement including an electrodeless discharge lamp having a sealed envelope enclosing an ionizable medium capable of emitting radiant energy when subjected to a radio frequency field and a circuit for operating the lamp. The circuit includes an oscillator for generating an output signal at a given radio frequency, an RF amplifier responsive to the oscillator output signal, and an output tank circuit including an induction coil and a capacitor connected in parallel. The RF amplifier includes a pair of semiconductor switches operating in a Class E mode. The induction coil is positioned in close physical proximity to the medium in the envelope for coupling to the medium an electric field having a magnitude sufficient to initiate ionization of the medium and a magnetic field for maintaining the ionization. In a preferred embodiment, the amount of EMI/RFI noise generated in the circuit is reduced by symmetrically driving the induction coil.

3 Claims, 1 Drawing Sheet

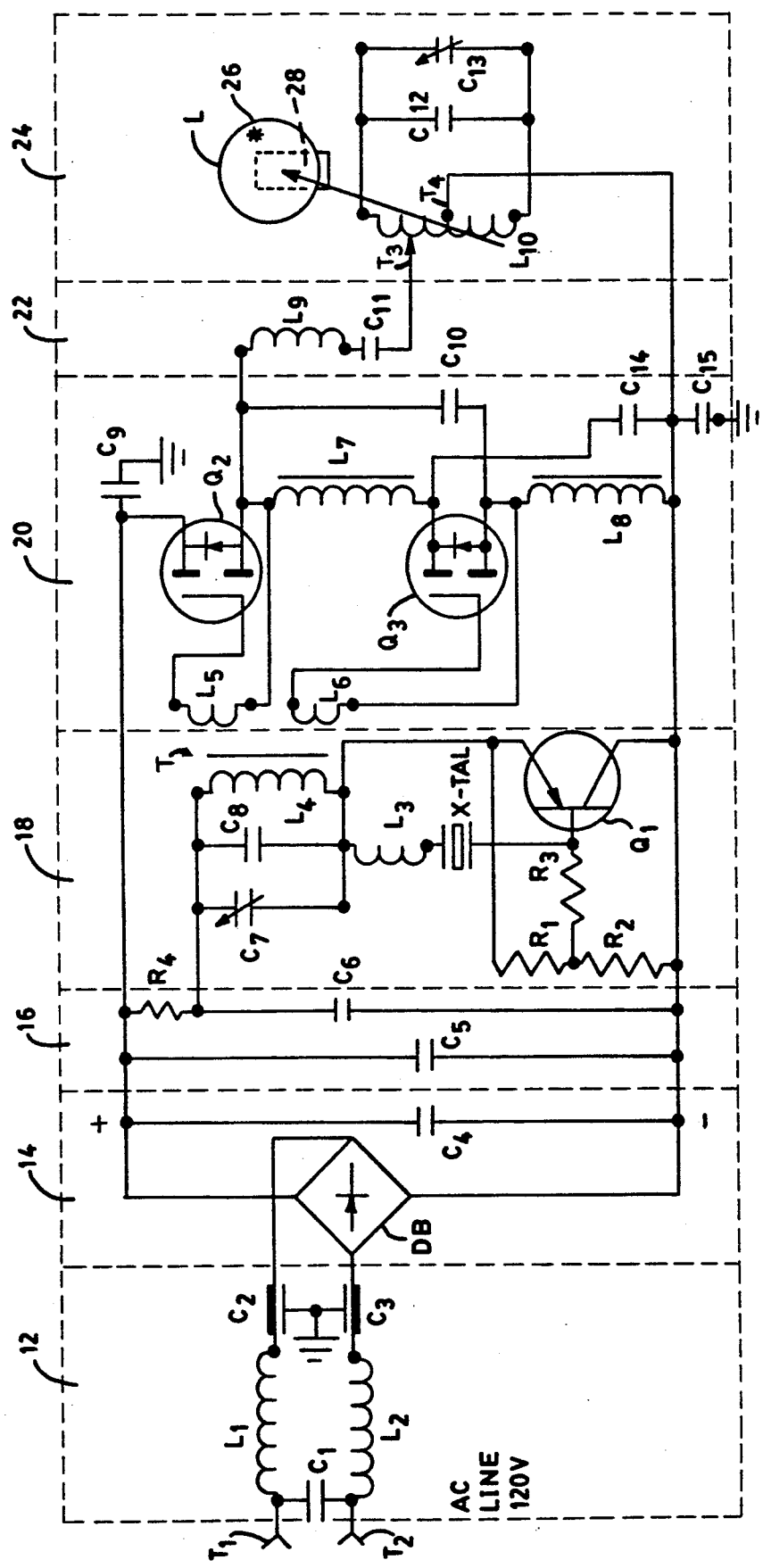

CIRCUIT CONTAINING SYMETRICALLY-DRIVEN COIL FOR ENERGIZING ELECTRODELESS LAMP

FIELD OF THE INVENTION

This invention relates in general to electrodeless discharge lamps and pertains, more particularly, to a circuit for efficiently driving such electrodeless discharge lamps.

BACKGROUND OF THE INVENTION

Electrodeless discharge lamps are well known in the art and typically include an ionizable medium within a sealed envelope including at least one particular ionizable gas at a given pressure capable of emitting radiant energy when subjected to a radio frequency field. An electric field having a magnitude sufficient to initiate ionization of the ionizable medium to form a radiation emitting discharge is coupled to the medium. Simultaneously, a radio frequency (RF) magnetic field for maintaining ionization is coupled to the ionizable medium. If the various parameters of the lamp are properly selected, a high efficiency electrodeless fluorescent lamp is theoretically possible.

It is known to drive the ionizable medium of such lamps by means of a circuit which may include a crystal-controlled oscillator for generating an output signal at a given radio frequency, an RF amplifier responsive to the oscillator output signal, and an inductive output coil and a capacitor responsive to the output of the amplifier. The output coil is positioned in close physical proximity to the envelope for coupling to the ionizable medium the electric and magnetic fields.

Such electrodeless discharge lamps are often operated in an ISM band at a frequency of 13.56 MHz, because the Federal Communications Commission, as well as the rest of the world, permits such frequency to be used with great liberality. However, when operating at such a frequency, a number of problems are created.

The first problem is selecting an amplifier circuit which will operate efficiently. Converting input energy into output power in an efficient manner is essential if an electrodeless discharge lamp is to compete effectively with other types of lamps. A Class A amplifier is known to have a very low efficiency, generally less than 50%, rendering it unsuitable for the present application. A Class B amplifier has the potential of being about 78.5% efficient, but, in reality, generally runs significantly less than this, rendering it unsuitable. A Class C amplifier is very sensitive to various capacitances within the circuit so that a Class C circuit does not lend itself well to mass production. Furthermore, transistors having a rating two times the DC input supply are generally required and this can present significant problems.

A Class D amplifier not only has the potential of being 100% efficient because it functions as an on/off switch, but also requires transistor ratings of only 125% of the DC input supply. Moreover, a Class D amplifier is typically not dependent on device-related parameters. On the other hand, several factors suggest against the use of a Class D amplifier. First of all, at frequencies above 2 MHz it is difficult to generate fast-switching waveforms across the inevitable circuit capacitances and to keep the power dissipation low when switching times are not small compared to the RF period. Second, push-pull type Class D circuits are especially vulnerable because simultaneous conduction in the two transistors can cause catastrophic failure.

A Class E amplifier, like a Class D amplifier, has the potential of being 100% efficient because it also functions as an on/off switch and it too is not dependent on device-related parameters. However, a Class E amplifier has an even worse voltage potential than a Class C amplifier since the typical single semiconductor switch requires a rating of as much as four times the DC input supply due to the high voltages developed across the switching device during operation. Since the Class E amplifier is a switching amplifier, the power semiconductor must be able to be switched on and off at the required frequency of operation.

Operation at a frequency of, for example, 13.56 MHz requires high speed switching semiconductors with low input and output capacitances and low on-state resistance. This requirement for low capacitance and low on-state resistance is in direct conflict, from a device standpoint, with the requirement for a high breakdown voltage. While it is possible to reduce the breakdown voltage of the switching semiconductor by reducing the AC voltage at the input to the DC supply by means of, for example, a step-down transformer or an AC input capacitor, such alternatives add significant cost to the circuit. In instances where the operating circuit is contained within the base of an electrodeless lamp unit intended as a replacement for an incandescent lamp, space and/or weight requirements may prohibit such alternatives.

Another problem arising from operating at a high frequency, such as 13.56 MHz, is that the quantity of electromagnetic interference (EMI) and radio-frequency interference (RFI) produced could interfere with some other allocated frequencies. An RF amplifier operating at a fundamental frequency of 13.56 MHz will produce a fourth harmonic frequency at 54.24 MHz, a fifth harmonic frequency at 67.80 MHz, and harmonics at other multiples of the fundamental. Since the first two harmonics (27.12 MHz band 40.68 MHz) are also ISM bands, the main concern is with the outband noise. While almost all the RF energy is at 13.56 MHz, the amount of noise in the fourth and higher harmonics along with outband noise between the allowable ISM bands should be at a minimum.

U.S. Pat. No. 4,245,178, which issued to James W. H. Justice, describes a high-frequency electrodeless discharge device operated by RF energy which is generated by a single transistor oscillator operating in a Class E mode. Because of the relatively low operating frequency of 100 kHz, highly efficient switching transistors having the necessary high voltage rating are readily available. However, switching devices having a high voltage rating and capable of high switching efficiencies at higher frequencies, such as 13.56 MHz, are not readily available.

U.S. Pat. No. 4,048,541, which issued to Adams et al, describes a crystal controlled Class D oscillator circuit for illuminating an electrodeless fluorescent lamp at a frequency of approximately 13.56 MHz. The circuit includes an output coil (16) connected to transistors (50,52) which drive the coil in a non-symmetric, push-pull operation.

To overcome the difficulties mentioned above, the present invention proposes a circuit for operating an electrodeless discharge lamp in which the circuit contains an RF amplifier operating in a Class E mode and having a pair of switching devices connected in series.

Moreover, the amount of EMI/RFI is significantly reduced by the use of a symmetrically-driven output coil.

SUMMARY OF THE INVENTION

It is, therefore, an object of the present invention to obviate the disadvantages of the prior art.

It is still another object of the invention to provide an improved circuit for energizing an electrodeless discharge lamp.

It is another object of the invention to provide a Class E amplifier which does not require a single semiconductor switch having a breakdown voltage of four times the DC supply voltage.

It is still another object of the invention to provide an RF amplifier which produces reduced amounts of electromagnetic and radio-frequency interference.

These objects are accomplished in one aspect of the invention by the provision of an arrangement comprising an electrodeless discharge lamp including a sealed envelope enclosing an ionizable medium capable of emitting radiant energy when subjected to a radio frequency field. The arrangement includes a circuit means for operating the electrodeless discharge lamp comprising a pair of AC terminals adapted to receive an AC signal from an AC power supply. A DC power supply is coupled to the AC input terminals for generating a DC voltage. An oscillator is coupled to the DC power supply for generating an output signal at a given radio frequency, such as 13.56 MHz. A Class E amplifier including first and second semiconductor switches and responsive to the oscillator output signal is connected in series with the DC power supply. An output tank circuit responsive to the output of said RF amplifier includes an induction coil and at least one capacitor connected in parallel. The induction coil is positioned in close physical proximity to the envelope for coupling to the ionizable medium an electric field having a magnitude sufficient to initiate ionization of the ionizable medium and a magnetic field for maintaining the ionization. The induction coil has an input tap and a return tap coupled to the output of the RF amplifier and is adapted to be symmetrically driven by the RF amplifier.

In accordance with further teachings of the present invention, the arrangement further comprises a matching network including a series combination of an inductor and a capacitor coupled between the output of the RF amplifier and the induction coil.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein:

The invention will become more readily apparent from the following exemplary description in connection with the accompanying FIGURE. This FIGURE represents a schematic diagram of a preferred embodiment of an RF driver circuit for operating an electrodeless discharge lamp.

BEST MODE FOR CARRYING OUT THE INVENTION

For a better understanding of the present invention, together with other and further objects, advantages and capabilities thereof, reference is made to the following disclosure and appended claims in connection with the above-described drawings.

The sole FIGURE represents a schematic diagram of a preferred embodiment of a RF driver circuit for operating an electrodeless discharge lamp L. Electrodeless discharge lamp L includes a sealed, light-transmitting glass envelope 26 which contains a ionizable medium including a noble gas or a mixture of noble gases and a quantity of mercury. Envelope 26 may be shaped as an incandescent lamp bulb, however any sealed enclosure, such as spherical, will suffice. The envelope may include an open, cylindrically-shaped re-entrant cavity 28 extending partially through the middle of envelope 26.

As examples of a practical lamp, the envelope is an A23 or G30 bulb having a diameter of 3 and 4 inches, respectively. The envelope is evacuated via an exhaust tube (not shown) which may extend through cavity 28 and is preferably provided with an ionizable medium consisting of krypton at a pressure of 0.1-1.0 torr and a quantity of mercury. The radio-frequency field is used to excite the mercury atom to produce an ultraviolet photon. A layer of phosphor (not shown) disposed on the interior surface of envelope 26 absorbs the ultraviolet photon and produces a visible photon. As a specific example of a phosphor, any of the standard halophosphates, such as Cool White, can be used. Alternatively, a three component blend of rare-earth activated phosphors can be used.

An electric field having a magnitude sufficient to initiate ionization of the ionizable medium and a magnetic field for maintaining the ionization is coupled to the medium by means of an induction coil L10 which is disposed within cavity 28 of envelope 26. Coil L10, which forms part of an output tank circuit 24, is preferably coupled through a matching network 22 to the output of an RF amplifier 20. RF amplifier 20 includes a pair of semiconductor switches Q2, Q3. Drive to RF amplifier 20 is provided by a crystal-controlled oscillator 18. Oscillator 18 and RF amplifier 20 receive filtered DC power from a DC supply 14 which is preferably coupled through an EMI filter 12 to a source of AC power. High-frequency noise generated in the circuit may be reduced by means of a high-frequency filter 16 coupled to the output of DC supply 14.

As illustrated in the sole FIGURE, an AC power supply such as 108 to 132 volts, 60 Hz is connected to a pair of input terminals T1, T2. The AC input signal from the AC supply is shown coupled to the input of an EMI filter 12 consisting of capacitors C1, C2, C3 and inductors L1, L2. Input terminal T1 is connected to a series combination of inductor L1 and capacitor C2. Similarly, input terminal T2 is connected to a series combination of inductor L2 and capacitor C3. Capacitor C1 of EMI filter 12 is connected across input terminals T1, T2. The output of EMI filter 12 is connected to the input of DC power supply 14 which consists of a diode bridge DB and a filter capacitor C4.

The output of DC power supply 14 is shown connected to a high-frequency pi-filter 16 consisting of capacitors C5, C6 and resistor R4. Besides forming part of filter 16, resistor R4 also reduces the DC input voltage to oscillator 18.

Oscillator 18 includes a PNP transistor Q1 having a collector connected to the negative terminal of DC power supply 14. A voltage divider network consisting of a pair of resistors R1, R2 is connected across the emitter-collector terminals of transistor Q1. The junction of resistors R1, R2 is coupled to the base terminal of transistor Q1 by means of a resistor R3. One end of a crystal X-TAL is connected to the base terminal of transistor Q1 while the other end of crystal X-TAL is connected to one end of an inductor L3 which act to close the feedback loop of oscillator 18. The other end of inductor L3 is connected to an oscillator tank circuit consisting of a trimmer capacitor C7, a fixed capacitor C8 and a primary winding L4 of an interstage transformer T. Trimmer capacitor C7 is used to tune oscillator 18 to an operating frequency such as 13.56 MHz.

As previously stated, an RF amplifier operating in Classes B or C is normally preferred over Class A mode of operation in order to obtain maximum efficiency consistent with power output. However, both Class B and Class C operation are subjected to variability due to changes in the transistor driver parameters and changes or differences of these parameters from one circuit to another which can result in variations of DC current and power output. Class D and Class E circuits are potentially more efficient than the Class B or Class C types and have good power output capability. Since these circuits operate in a switching mode action, they are less subject to changes in the transistor drive parameters and are thus more readily reproducible.

While the performance of Class D circuits is good, several factors suggest against the use of a Class D amplifier. First of all, in Class D amplifiers it is hard to generate fast-switching waveforms across the inevitable circuit capacitances and to keep the power dissipation low when switching times are not small compared to the RF period. Second, push-pull type Class D circuits are especially vulnerable because simultaneous conduction in the two output transistors can cause catastrophic failure (breakdown) of the transistors.

In a conventional Class E amplifier having a single semiconductor switch, the switch requires a rating of as much as four times the DC input supply due to the high voltages developed across the switching device during operation. In the case of a filtered DC power supply operating from 120 volts AC line, the DC supply has a peak voltage of 170 volts. Consequently, the semiconductor switch should have a breakdown voltage $V_{DS}$ of at least 700 volts. While semiconductor switches having such a breakdown voltage are available, a high $V_{DS}$ parameter is in conflict with the fast switching times required for a high frequency, such as 13.56 MHz, low device dissipation (low on-state resistance) and low input/output capacitance values. The breakdown voltage, given the switching speed and output capacitance, will limit the operating voltage of the circuit.

In accordance with the teachings of the present invention, RF amplifier 20 includes a pair of semiconductor switches Q2, Q3 operating in a Class E mode. Semiconductor switches Q2, Q3 may be bipolar transistors or preferably, as illustrated in the sole FIGURE, are power field effect transistors (FETs). Semiconductor switches Q2, Q3 are connected in series across DC power supply 14 but appears in parallel to the RF signal from driving oscillator 16. Such an arrangement allows operation from the 120 volt AC supply in a class E mode.

As a specific example, semiconductor switches Q2 and Q3 are a type IRF 710 (International Rectifier) having a breakdown voltage $V_{DS}$ equal to 450 VDC.

As illustrated in the sole FIGURE, the drain terminal of semiconductor switch Q2 is connected to the positive terminal of DC power supply 14 and to a high-frequency bypass capacitor C9. The other end of bypass capacitor C9 is connected to circuit ground. Drive for semiconductor switch Q2 is provided by a secondary winding L5 located on interstage transformer T. One end of secondary winding L5 is connected to the gate terminal of semiconductor switch Q2 while the other end of winding L5 is connected to the source terminal of switch Q2. The source terminal of semiconductor switch Q2 is coupled to the drain terminal of semiconductor switch Q3 via a radio-frequency choke L7.

Drive for semiconductor switch Q3 is provided by a secondary winding L6 located on the interstage transformer. One end of secondary winding L6 is connected to the gate terminal of semiconductor switch Q3 while the other end of winding L6 is connected to the source terminal of switch Q3. The source terminal of semiconductor switch Q3 is coupled to the negative terminal of DC power supply 14 via a radio-frequency choke L8. In order to prevent the voltage across semiconductor switches Q2, Q3 from changing abruptly, RF amplifier 20 further includes a pair of capacitors C10, C14. One end of capacitor C10 is connected to the source terminal of semiconductor switch Q2 while the other end is connected to source terminal of semiconductor switch Q3. One end of capacitor C14 is connected to the drain terminal of semiconductor switch Q3 while the other end is connected to the negative terminal of DC power supply 14. A high-frequency bypass capacitor C15 is connected between the negative terminal of DC power supply 14 and circuit ground.

In order to reduce the amount of EMI/RFI noise, the drain terminals of both FETs are AC (RF) grounded. The drain terminal of transistor Q2 is directly grounded through capacitor C9 and the drain terminal of transistor Q3 is AC grounded through AC capacitor C14. Preferably, the drain tab of each power FET is connected directly to a suitable heat sink using any form of electrical insulator (e.g., mica, silicone, rubber, etc.). AC grounding of the drains help to keep the output capacitance of the power FET device to a minimum and provides a very low impedance path to ground (i.e., the heat sink) for any EMI/RFI noise.

Moreover, by maintaining a minimum output capacitance for the power FETs, a greater flexibility is gained in the choice of capacitors used in the matching/injection network 22 located between the FETs and the output tank circuit 24. This is important in order to minimize the EMI/RFI noise, which at this point is mainly due to switching (i.e., turning the power FET on and off). If, for example, the output capacitance of the power FET is too high (due in part to the drain-to-heat sink capacitance), the FET will behave as a lossy, non-linear switch during the turn-on and turn-off times. This will lead to a rich generation of EMI/RFI noise and a loss of amplifier efficiency. Since the proper design of a Class E amplifier will force the power FET to act as a low-loss, high efficiency switch, there must be design room (in terms of device parameters) to make adjustments. This becomes strongly pronounced when considering the fact of high voltage, high switching speed and low input/output capacitance power FETs are difficult, if not impossible, to obtain.

The output of RF amplifier 20 is connected to a matching network 22 consisting of a series combination of an inductor L9 and a capacitor C11. Network 22 impedance matches the output impedance of RF amplifier 20 to the impedance of the output tank circuit and lamp.

In accordance with another aspect of the present invention, the output tank circuit 24 includes a symmetrically-driven induction coil L10. As illustrated in the sole FIGURE, induction coil L10 has an input tap T3 connected to the output of matching network 22 and a return tap T4 connected to the negative terminal of DC power supply 14. A parallel combination of a fixed capacitor C12 and a trimmer capacitor C13 is connected across output coil L10. Trimmer capacitor C13 is used to tune output tank circuit 24 for maximum power to lamp L.

By a "symmetrically-driven" coil is meant that the instantaneous voltage between one end of induction coil L10 and the return tap T4 is the same as the instantaneous voltage between the other end of induction coil L10 and return tap T4. In the sole FIGURE, the voltage developed between input tap T3 and return tap T4 may be equal to about one-third the voltage measured between the ends of induction coil L10. The differential voltage across coil L10 is sufficient to start and operate lamp L while the voltage developed between either end of coil L10 and circuit ground is one-half the lamp voltage.

In contrast to an induction coil which in non-symmetrically driven, the developed voltages with respect to circuit ground are higher than those developed in the symmetrical case. As a result, since the developed voltage in a symmetrically-driven coil is smaller than that developed in the non-symmetrically-driven coil, the corresponding EMI/RFI noise voltages are smaller. Moreover, the odd harmonics of the noise content are eliminated while the remaining (even) harmonics are reduced.

In a practical embodiment, output coil L10 is an air-core inductor consisting of from about 7 to 10 turns of 12-gauge wire. In order to obtain maximum Q for a particular inductance, the width of each turn and the total length of the turns are equal to each other and typically range from about 1.0 inch to 1.5 inches.

There has thus been shown and described a circuit for operating an electrodeless discharge lamp. The invention includes a circuit containing a Class E amplifier which does not require a single semiconductor switch having a breakdown voltage of four times the DC supply voltage. The amount of EMI/RFI is significantly reduced by the use of a symmetrically-driven output coil.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An arrangement comprising:
   an electrodeless discharge lamp including a sealed envelope enclosing an ionizable medium capable of emitting radiant energy when subjected to a radio frequency field; and
   circuit means for operating said electrodeless discharge lamp, said circuit means comprising:
   a pair of AC terminals adapted to receive an AC signal from an AC power supply;
   DC power supply means coupled to said AC input terminals for generating a DC voltage;
   oscillator means coupled to said DC power supply means for generating an output signal at a given radio frequency;
   RF amplifier means responsive to said oscillator output signal, said RF amplifier means being a Class E amplifier including first and second semiconductor switches connected in series with said DC power supply; and
   an output tank circuit including an induction coil and capacitor means connected in parallel and responsive to the output of said RF amplifier, said induction coil being positioned in close physical proximity to said envelope for coupling to said ionizable medium an electric field having a magnitude sufficient to initiate ionization of said ionizable medium and a magnetic field for maintaining said ionization, said induction coil having a pair of ends and having an input tap and a return tap coupled to the output of said RF amplifier and adapted to by symmetrically driven by said RF amplifier whereby the instantaneous voltage between one end of said induction coil and said return tap is the same as the instantaneous voltage between the other end of said induction coil and said return tap.

2. The arrangement of claim 1 further comprising matching network means including a series combination of an inductor and a capacitor coupled between the output of said RF amplifier and said induction coil.

3. In an electrodeless discharge lamp including a sealed envelope enclosing an ionizable medium capable of emitting radiant energy when subjected to a radio frequency field, an oscillator for generating an output signal at a given radio frequency, an RF amplifier responsive to said oscillator output signal, and an output tank circuit including an induction coil and a capacitor connected in parallel and responsive to the output of said RF amplifier, said induction coil being positioned in close physical proximity to said envelope for coupling to said ionizable medium an electric field having a magnitude sufficient to initiate ionization of said ionizable medium and a magnetic field for maintaining said ionization, the improvement wherein:
   said induction coil having a pair of ends and having an input tap and a return tap coupled to the output of said RF amplifier and adapted to by symmetrically driven by said RF amplifier whereby the instantaneous voltage between one end of said induction coil and said return tap is the same as the instantaneous voltage between the other end of said induction coil and said return tap.

* * * * *